July 26, 1955 — N. A. SIEGAL — 2,713,960
FEEDING AND HANDLING MECHANISM FOR CONTAINER FILLING MACHINES
Filed Nov. 22, 1950 — 3 Sheets-Sheet 1
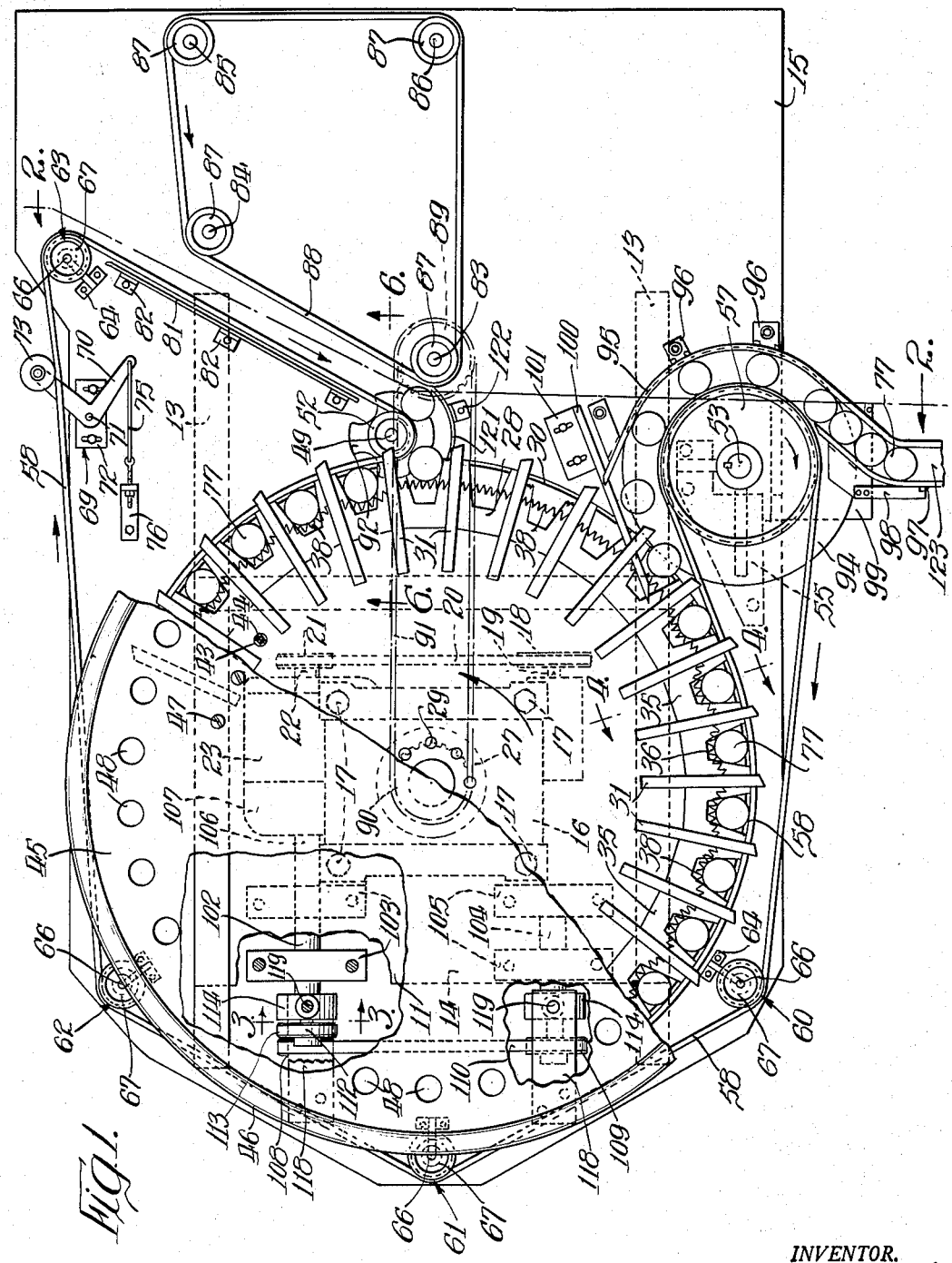
INVENTOR.
Norman A. Siegal
BY Kegan and Kegan
Attys

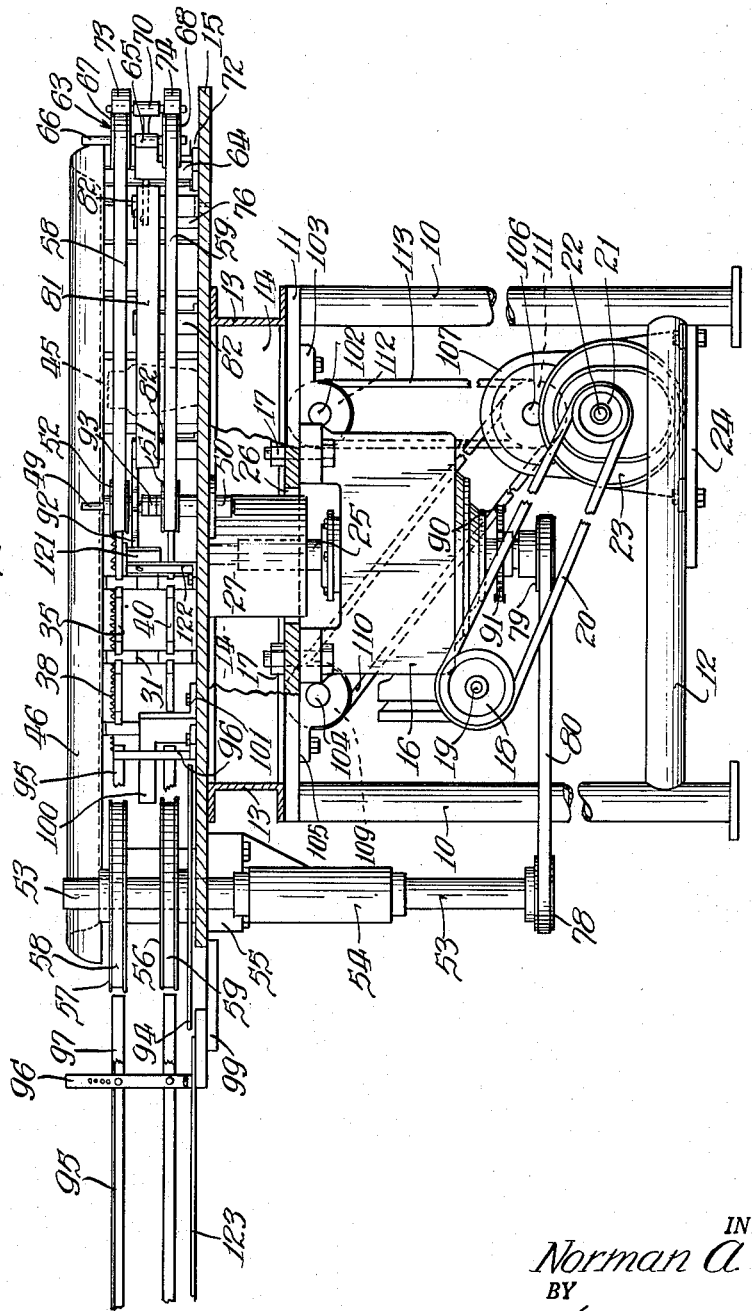

July 26, 1955     N. A. SIEGAL     2,713,960
FEEDING AND HANDLING MECHANISM FOR CONTAINER FILLING MACHINES
Filed Nov. 22, 1950     3 Sheets-Sheet 3
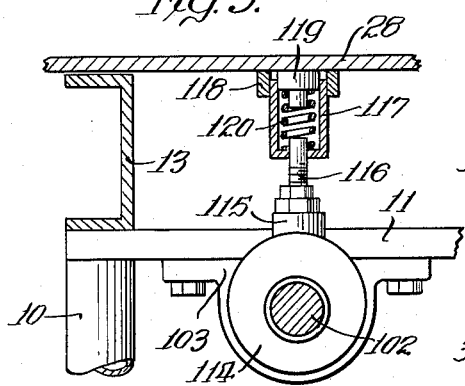
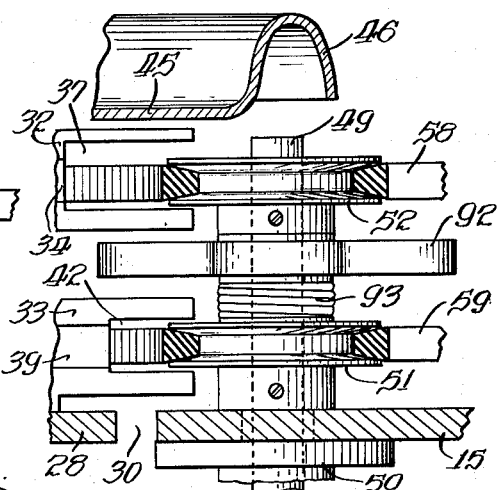
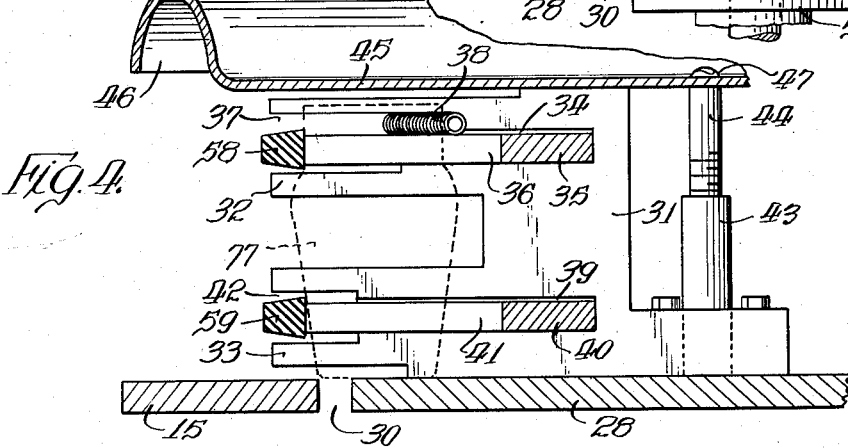
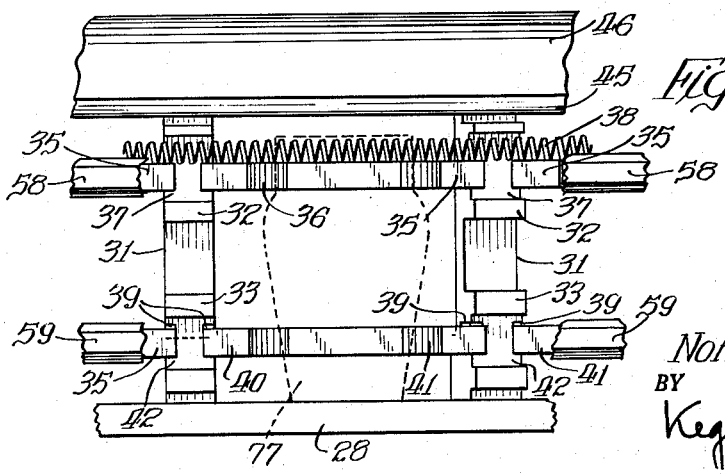
INVENTOR.
Norman A. Siegal
BY Kegan and Kegan
Attys.

United States Patent Office 2,713,960
Patented July 26, 1955

2,713,960

FEEDING AND HANDLING MECHANISM FOR CONTAINER FILLING MACHINES

Norman A. Siegal, Chicago, Ill., assignor to Irvin Swartzberg, Chicago, Ill.

Application November 22, 1950, Serial No. 197,008

10 Claims. (Cl. 226—72)

My invention relates generally to apparatus for filling containers with food commodities, and more particularly to apparatus for filling glass jars with cherries, olives and other food products.

Before my invention, the practice in filling containers with food products was to place said containers on a fixed circular track and push the containers around the track as they were being filled. While this method generally is satisfactory where metallic containers such as tin cans are being filled, it is not unusual to break glass jars and other frangible containers which are processed through the prior art apparatus. This breakage is due principally to the jar becoming tipped and wedged against the fixed track. This problem is difficult to overcome in the prior art apparatus because of variations in size between different containers, even though all are from the same lot. This breakage problem is especially costly and bothersome where the same apparatus is being used for processing jars of different sizes, since this increases the probability of the jars tipping and becoming wedged in the apparatus.

It is accordingly a principal object of my invention to provide apparatus which eliminates breakage of or damage to containers and especially glass jar containers, said apparatus being characterized by supporting means which move along with the containers, so that as the containers are being filled, there is no motion of any container relative to any member which is in contact with the container.

Another important object of my invention is the provision of apparatus which can be quickly and easily adjusted to handle containers of different sizes, said apparatus employing for this purpose receptacles in which the containers are firmly held by means of an endless belt which moves with the receptacles. In practice, the receptacles may be placed around a turntable, while the endless belt is looped around the turntable much as though it were a pulley.

Another object of the instant invention is to provide filling apparatus which operates at high speed, so that containers may be filled at a high rate, for example as many as 120 containers per minute.

The foregoing and such other objects, advantages and capabilities as are disclosed as this description proceeds, or which are inherent to my invention, are illustrated in the accompanying drawings, in which:

Figure 1 is a fragmentary plan view of filling apparatus embodying my invention, with some parts thereof broken away to show underlying details;

Figure 2 is a right side view taken in section on the line 2—2 of Figure 1;

Figure 3 is a left side view taken in section on the line 3—3 of Figure 1, showing a detail of the jar vibrating mechanism used with my apparatus;

Figure 4 is a fragmentary detail view taken in section on the line 4—4 of Figure 1;

Figure 5 is substantially a front view of the apparatus shown in Figure 4; and

Figure 6 is a fragmentary detail view taken in section on the line 6—6 of Figure 1.

Like reference characters designate like parts in the drawings and in the description of my filling apparatus which follows.

Referring now to the drawings, and more particularly to Figure 2 thereof, my filling apparatus is shown as including a supporting structure composed of a plurality of uprights 10 surmounted by a plate 11 and braced by cross members 12. A pair of lengthwise channel irons 13, 13 extend along two opposite sides of the plate 11, while two other channel irons 14, 14 extend across the plate 11 to form a rectangular support for the table 15. A gear reduction unit 16 is hung from the plate 11 by the fasteners 17, and is driven by the pulley 18 on the input shaft 19. The pulley 18 is in turn driven through the V-belt 20 and the pulley 21 on the shaft 22 of the motor 23. The motor 23 is supported upon the plate 24 extending between two of the cross members 12. The main output shaft 25 of the gear reduction unit 16 is positioned vertically with the upper end portion thereof extending through the opening 26 in the plate 11. A hub 27 is drivably secured to the shaft 25, the turntable 28 being secured to the hub 27 by the fasteners 29, for rotation within the circular opening 30 in the table 15.

Referring now to Figures 1 and 4, a plurality of thin upright blocks or partitions 31 are spaced uniformly around and extend radially of the turntable 28, and overhang the table or apron 15. Each of the blocks 31 includes two outwardly extending finger portions 32 and 33 which are vertically spaced apart. Each side of the upper finger portion 32 is provided with a groove 34, the grooves 34 in every two adjacent finger portions 32 slidably receiving and positioning a removable, horizontal insert plate 35 having a notch 36 in the peripheral edge portion thereof between the fingers 32. The upper finger portion 32 also includes an outwardly facing slot 37 which is open above the insert 35. A closed helical spring 38 extends through the slots 37 in the upper finger portions 32 to encircle the turntable 28, to provide a resilient back-up member between each two adjacent blocks 31. The lower finger portions 33 of the blocks 31 also contain a groove 39 in each radial faces thereof, and every two of them are adapted to slidably receive and position a removable horizontal insert plate 40 having a notch 41 in its peripheral edge. Like the finger portion 32, the finger portion 33 contains an outwardly facing slot 42, for a purpose to be described below.

As shown in Figures 1 and 4, a plurality of sleeves 43 extend upwardly from the turntable 28. Each of the sleeves 43 is provided with a threaded, adjustable post 44. A filler plate 45 having a peripheral flange 46 thereon, is supported by the threaded posts 44 and is secured thereto by the fasteners 47. As best shown in Figure 1, the filler plate 45 is provided with a plurality of filler openings 48 each of which is positioned intermediate two different blocks 31.

As best shown in Figure 6, a shaft 49 extends upwardly from the apron or table 15 adjacent to the turntable 28, and is supported by a bearing 50. Two pulleys 51 and 52 are secured to the shaft 49 for rotation therewith, the lower pulley 51 being aligned with the slot 42 in each of the lower finger portions 33, while the upper pulley 52 is positioned in alignment with the slot 37 in each of the upper finger portions 32. As best shown in Figures 1 and 2, a second shaft 53 extends upwardly from the apron or table 15 and is rotatably mounted in the sleeve bearing 54 carried by the bearing support bracket 55. A pulley 56 is keyed to the shaft 53 substantially in alignment with the slot 42 in each of the lower finger portions 33. Similarly, a pulley 57 is keyed to the shaft 53 in alignment with the slot 37 in each of the upper finger portions 32 of the blocks 31. A first endless V-belt runs over the upper pulley 52, around the turntable 28, over the upper pulley 57, and thence back to the pulley 52. A second endless V-belt 59 is spaced below the V-belt 58, and runs over the lower pulley 51, around the turntable 28, and over the lower pulley 56 on the shaft 53. The extent to which the belts 58 and 59 extend into the slots 37 and 42 of the blocks 31 depends upon the shape of the insert notches 36 and 41 and the containers nested therein.

In returning from the pulleys on the shaft 53 to the pulleys on the shaft 49, the two V-belts 58 and 59 are supported by a plurality of belt support assemblies 60, 61, 62 and 63. As best shown in Figures 1 and 2, each of the belt support assemblies 60–63 includes a bracket support 64 having a bearing portion 65 thereon, a vertical shaft 66, and an upper pulley 67 and a lower pulley 68 on said shaft 66. The two V-belts 58 and 59 are maintained under the desired degree of tension by the belt tensioning assembly 69 (Figure 1). Said assembly 69 comprises a bell crank 70 pivotally mounted on the shaft 71 which extends upwardly from the adjustable support plate 72. One arm of the bell crank 70 is provided with a pair of rollers 73 and 74, while the other arm of the bell crank 70 is adjustably positioned by an adjustable-length link 75 connected to the bracket 76.

As will become apparent as this exposition proceeds, in operating my apparatus, the containers 77 which are to be filled are positioned on the turntable 28 between the inserts 35 and 40 on the one hand, and the V-belts 58 and 59, on the other hand. Thus the turntable 28, blocks 31 thereon and containers 77 therebetween, act substantially as a pulley, and provide a major part of the driving force moving the V-belts 58 and 59 around and over the various pulleys indicated above. In addition, the shaft 53 is rotated by means of the drive mechanism best shown in Figure 2. More particularly, the pulley 78 on the lower end of the shaft 53 is drivably connected to the pulley 79 on the main output shaft 25 through the V-belt 80. In practice, I prefer that the shaft 53 drives the pulleys 56 and 57 thereon at a higher linear velocity, at the peripheral edges thereof, than the linear velocity at which the turntable 28 moves the V-belts 58 and 59, for a purpose to be described below.

Positioned between those spans of the V-belts 58 and 59 extending between the belt support assembly 63 and the shaft 49, is a guide strip 81, which is supported by the bracket members 82. A plurality of shafts 83, 84, 85 and 86 extend upwardly from the apron 15 in the positions shown in Figure 1. Pulleys 87 are mounted on the shafts 83—86, and provide support for the endless V-belt 88. The shaft 83 extends beneath the apron 15, and has a drive sprocket 89 thereon which is drivably connected to the drive sprocket 90 on the main output shaft 25, by the link belt 91. In this fashion, the endless belt 88 is moved in the direction shown by the directional arrows, so that the parallel spans of the V-belt 88 on the one hand and the V-belts 58 and 59 on the other hand, form a channel along which the containers 77 are moved toward the turntable 28.

Referring now to Figure 6, a star wheel 92 is mounted on the shaft 49 intermediate the pulleys 51 and 52. The star wheel 92 is drivably connected to the pulleys 51 and 52 through slip clutch mechanism which in the form shown in the drawings comprises a helical spring 93. Thus the star wheel 92 rotates with the shaft 49 until a predetermined countertorque is applied to the star wheel 92, whereupon it commences to slip relative to the shaft 49 until the said countertorque is removed or reduced below the critical value. An arcuate guide rail 121 supported by the bracket 122 is positioned substantially concentric of the shaft 49, to serve as a continuation of the span of the V-belt 88 which extends from the shaft 84 to the shaft 83.

Referring now to Figures 1 and 2, a circular plate 94 is secured to the shaft 53 intermediate the lower pulley 56 and the apron 15, and serves as a rotating platform for containers 77 as they leave the turntable 28. A guide rail 95 supported by the brackets 96 is positioned to lie adjacent to the peripheral edge of the circular plate 94, and to extend therefrom in the manner shown in Figure 1. The extending portion of the guide rail 95, together with the guide rail 97, its supporting bracket 96, and the conveyor platform 123 are in turn supported by the plate 99 extending from beneath the table 15. To guide the containers 77 from the turntable 28, an arm 100 projects across the turntable 28 from the bracket 101 on the table 15, and extends successively between the upper finger portion 32 and lower finger portion 33 of each of the blocks 31 as the turntable 28 rotates.

The rotating turntable 28 is vibrated by suitable vibrator mechanism, which in the form shown in the drawings comprises a first shaft 102 supported by the pillow block bearings 103, 103 and a second shaft 104 supported by the pillow block bearings 105, 105. Each of the shafts 102, 104 is driven off of the main vibrator shaft 106 which is connected to the motor 23 through the gear box 107. Said main vibrator shaft 106 is connected to the shaft 104 through their associated pulleys 108, 109 and the interconnecting drive belt 110. Similarly, the other shaft 102 is connected to the vibrator shaft 106 through the associtaed pulleys 111, 112 and the interconnecting drive belt 113. An eccentric cam 114 is secured to each of the shafts 102 and 104 and actuates a follower 115 to which a follower rod 116 is adjustably secured. A cup-shaped member 117 is carried on the upper end of each of the rods 116, and is restrained to vertical motion by the guide plate 118. A plunger 119, which is spring loaded by the spring 120, is contained in the cup-shaped member 117, and engages the undersurface of the turntable 28. Accordingly, as the eccentric cams 114, 114 rotate, reciprocating motion is imparted to each of the plungers 119, 119, as a consequence of which the turntable 28 is vibrated.

Operation of apparatus

To use my new filler apparatus, the motor 23 is first started, which causes the various components to move in the direction indicated by the directional arrows of Figure 1. A supply of empty containers 77 is conveyed from the upper right hand portion of the apron or table 15 (Figure 1) between the two parallel sections of the V-belt 88 on the one hand and the V-belts 58 and 59 on the other hand, until contacted by the rotating star wheel 92. As the star wheel 92 turns, it selects empty containers 77 one at a time, moves them along the arcuate guide rail 121, and places them upon the turntable 28 between successive pairs of the blocks 31. The notches 36 and 41 in each set of inserts 35 and 40, provide a recessed holder for the containers 77. As the turntable 28 continues to turn, the container 77 which has just been placed thereon by the star wheel 92 is clamped against the inserts 35 and 40 by the V-belts 58 and 59. The helical spring 38 insures a positive radial holding pressure for each container 77 against the V-belts 58 and 59, so that said containers are held securely upon the turntable 28 as it revolves and vibrates.

Advantageously, the star wheel 92 moves an empty container for placement upon the turntable 28 only when there is an empty holder to receive it. If the container 77 is not properly aligned with a pair of inserts 35 and 40, the helical spring 93 permits the star wheel 92 to slip relative to the shaft 49 until such time as the proper alignment is attained.

As the containers 77 on the turntable 28 are carried toward the shaft 53, they may be filled with olives, cherries, cut vegetables or other products through the openings 48 in the filler plate 45, each opening being positioned directly over and moving with an empty container 77. The moving turntable 28 is continuously vibrated by the movement of the plungers 119, 119 of the vibrating mechanism, which acts to jar and compact the articles which have been deposited in the containers 77. After the containers 77 have been filled, they continue to turn with the turntable 28 until contacted by the arm 100. Said arm 100 and the V-belts 58 and 59 moving on to the pulleys 56 and 57, form a channel along which the filled containers are conveyed on to the circular plate 94. As the circular plate 94 turns with the shaft 53, the filled containers are transferred from the plate 94 on to the conveyor platform 123.

After the apparatus has been in use for a short period of time, the V-belts 58 and 59 usually become wet, especially when the containers 77 are being filled with wet or juicy vegetables, fruits or similar food products. As a result, there is some tendency for the belts 58 and 59 to slip relative to the containers 77. To overcome this slippage, the pulleys 56 and 57 on the shaft 53 are deliberately made over running, that is the linear velocity of the outer edges of the pulleys 56 and 57 is somewhat greater than the linear velocity of the turntable 28 at the belt-engaging outer surfaces of the container 77. Thus, as the apparatus is first started up, there is a small amount of slippage between the pulley 78 and the drive belt 80 (Figure 2). However, as the V-belts 58 and 59 become wet, and their coefficient of friction with the containers 77 decreases, the pulleys 56 and 57 provide a booster action which prevents any appreciable amount of slippage.

Advantageously, my apparatus may be quickly adapted to handle containers of different sizes, by means of a few simple adjustments. Thus for example, when a container of a different cross sectional configuration from that of the container 77 is to be handled, the inserts 35 and 40 are removed and replaced by new inserts having notches complementary to the shape of container which is to be handled. Where the height of the containers is changed, the clearance between the filler plates 45 and the turntable 28 is increased or decreased correspondingly, by adjusting the threaded posts 44 in the sleeves 43 (Figure 4). Where the cross sectional configuration of the new container being handled is significantly different from that of the container 77 shown, then it may be necessary to replace the star wheel 92 with one whose notches or indentations correspond in shape to that of the new container. This adjustment is readily accomplished by removing the pulley 52, whereupon the star wheel 92 shown may be readily replaced with one having the desired shape.

Regardless of the size and shape of the container being handled, in every case the containers are nested on the turntable 28 between the inserts 35 and 40 on the one hand, and the V-belts 58 and 59 on the other hand, with the spring 38 providing supplemental support. Thus, as the containers 77 are being rotated and vibrated in order to be filled, there is no sliding of the containers 77 relative to any element of the apparatus, thus preventing jamming and possible breakage of or damage to the containers.

While I have shown and described certain embodiments of my invention, it is to be understood that these embodiments have been given by way of example only and that various changes and rearrangements of the details shown herein may be made without departing from the spirit of the invention, the scope of which is defined in the appended claims.

I claim:

1. In a machine for filling variably profiled, large-mouth containers, a horizontally mounted rotatable turntable, a plurality of substantially radial partitioning blocks mounted and equally spaced peripherally upon said turntable, said blocks having notches, each at the peripheral end of the blocks, a first endless resilient belt deeply inserted within said notches, a second endless belt means shallowly inserted within said notches and having ingress and exit flight portions extending from the periphery of the turntable to provide a return flight thereon, the belt portions in said notches defining between one another and between every two partitioning blocks a space for the reception, resilient holding and ultimate removal of one of said containers.

2. A machine according to claim 1 wherein the first resilient belt deeply inserted in the notches substantially consists in an endless, spirally wound spring, entirely supported by and upon said turntable.

3. A machine according to claim 1 wherein the second endless belt means shallowly inserted in the notches is a substantially nonresilient V-belt and wherein said nonresilient V-belt has a driving means near at least one of said ingress and exit flight portions thereof adapted to drive said nonresilient V-belt at a linear speed slightly greater than the peripheral speed of the outer belt engaging surfaces of the containers on the turntable.

4. In a machine for filling large-mouth containers, a pair of superposed, horizontally mounted rotatable coaxial turntables, a plurality of substantially vertical and radial partitions therebetween equally spaced peripherally thereof to form peripheral chambers, one for each container to be filled, the upper turntable having an aperture at the approximate center of each of said chambers and having an upstanding flange and each of said partitions having notches, each in the peripheral end of the partitions, an annular resilient belt deeply inserted within said notches, an endless belt means shallowly inserted within said notches and extending along a major portion of the periphery of the turntables and having a return flight portion interconnecting the ends of the major portion of the periphery while providing free ingress and egress for containers to and from the remainder of the periphery of the turntables, thereby providing for each of said containers a space between the two turntables wherein the container is resiliently engaged between the two belts, within the corresponding chamber.

5. A machine according to claim 4 comprising means to vertically adjust the two turntables relative to one another, the partitions being secured to one of the turntables.

6. In a machine for filling large-mouth containers with materials capable of being packed more closely by vibration, a horizontal turntable, means to rotate the turntable, means to vibrate the turntable, means on the turntable to support an inner resilient annular belt and a portion of an outer endless belt extending over a major portion of the periphery of the turntable, means to support a return portion of the outer belt while not interfering with the access of empty containers to the turntable and the removal of filled containers therefrom, means to provide such access and removal, and means to maintain a predetermined peripheral spacing between the containers while on the turntable, whereby the containers while on the turntable, are resiliently held between the belts regardless of the rotation and vibration of the turntable.

7. A machine according to claim 6 wherein the means to space the containers on the turn table comprises a series of substantially radial partitions equally spaced periperally on the turntable, said partitions also supporting the inner belt and the turntable-contacting portion of the outer belt.

8. In a machine according to claim 7, a horizontal insert plate between every two partitions, slidably inserted in grooves formed in the surfaces of the partitions and having a notch in the peripheral portion of the insert plate, substantially conforming with the profile of the container to be filled.

9. A machine according to claim 8 wherein the means to feed containers to the turntable comprises a star wheel horizontally and rotatably mounted adjacent the periphery of the turntable, the return portion of the belt being trained about said star wheel.

10. A machine according to claim 9 wherein the star wheel is mounted upon a vertical drive shaft by means of a slip clutch so that the machine can reject containers selected by the star wheel until one of the chambers, unoccupied by a container is brought to the vicinity of the star wheel by the rotation of the turntable.

References Cited in the file of this patent

UNITED STATES PATENTS

| | | |
|---|---|---|
| 1,403,879 | Taliaferro | Jan. 17, 1922 |
| 2,005,471 | Pittaluga | June 18, 1935 |
| 2,329,304 | Stewart | Sept. 14, 1943 |
| 2,357,826 | Hohl | Sept. 12, 1944 |
| 2,484,101 | Krueger | Oct. 11, 1949 |